(12) United States Patent
Xiao et al.

(10) Patent No.: US 8,908,640 B2
(45) Date of Patent: Dec. 9, 2014

(54) METHOD, APPARATUS AND SYSTEM FOR HANDOVER BETWEEN MULTI-CARRIER CELLS

(75) Inventors: Dengkun Xiao, Beijing (CN); Yuan He, Beijing (CN); Anjian Li, Beijing (CN); Jing Han, Beijing (CN); Qing Li, Shenzhen (CN); Wenjie Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 315 days.

(21) Appl. No.: 13/195,231

(22) Filed: Aug. 1, 2011

(65) Prior Publication Data
US 2011/0286433 A1 Nov. 24, 2011

Related U.S. Application Data

(63) Continuation of application No. PCT/CN2009/070337, filed on Feb. 2, 2009.

(51) Int. Cl.

| | |
|---|---|
| *H04W 4/00* | (2009.01) |
| *H04W 36/00* | (2009.01) |
| *H04L 5/00* | (2006.01) |
| *H04W 24/10* | (2009.01) |
| *H04W 28/04* | (2009.01) |
| *H04W 36/08* | (2009.01) |
| *H04W 72/12* | (2009.01) |
| *H04W 92/20* | (2009.01) |

(52) U.S. Cl.
CPC ......... *H04W 36/0033* (2013.01); *H04L 5/0007* (2013.01); *H04L 5/001* (2013.01); *H04W 24/10* (2013.01); *H04W 28/04* (2013.01); *H04W 36/08* (2013.01); *H04W 72/12* (2013.01); *H04W 92/20* (2013.01)

USPC ........... 370/331; 370/332; 455/433; 455/434; 455/436; 455/437; 455/38

(58) Field of Classification Search
USPC ......................................................... 370/331
See application file for complete search history.

(56) References Cited

U.S. PATENT DOCUMENTS

| | | | |
|---|---|---|---|
| 7,184,419 B2 * | 2/2007 | Hwang et al. | 370/331 |
| 8,031,673 B2 * | 10/2011 | Craig et al. | 370/331 |

(Continued)

FOREIGN PATENT DOCUMENTS

| | | |
|---|---|---|
| CN | 101048001 | 10/2007 |
| CN | 101098294 | 1/2008 |

(Continued)

OTHER PUBLICATIONS

International Search Report issued Nov. 5, 2009 in corresponding International Patent Application No. PCT/CN2009/070337.

(Continued)

*Primary Examiner* — Jackie Zuniga Abad
*Assistant Examiner* — Lakeram Jangbahadur
(74) *Attorney, Agent, or Firm* — Staas & Halsey LLP (57) ABSTRACT

The present invention relates to the radio communication field and discloses a method, an apparatus, and a system for handover between multi-carrier cells, so that a user equipment (UE) can be handed over to carriers of different cells on multiple target evolved NodeBs (eNBs). The handover method includes: after performing handover request acknowledge, receiving serial numbers (SNs) of data to be transferred and identifier information of target eNBs of other carriers to which the UE is handed over sent by a source eNB; and transferring scheduling information to the target eNBs of other carriers to which the UE is handed over.

15 Claims, 5 Drawing Sheets

(56) References Cited

U.S. PATENT DOCUMENTS

| | | | |
|---|---|---|---|
| 8,134,974 B2* | 3/2012 | Chun et al. | 370/331 |
| 8,179,860 B2* | 5/2012 | Brusilovsky et al. | 370/331 |
| 8,213,940 B2* | 7/2012 | Hapsari et al. | 455/436 |
| 8,259,677 B2* | 9/2012 | Olsson et al. | 370/331 |
| 8,265,629 B2* | 9/2012 | Kwon et al. | 455/436 |
| 8,331,933 B2* | 12/2012 | Koo et al. | 455/436 |
| 8,374,150 B2* | 2/2013 | Kitazoe | 370/331 |
| 8,411,619 B2* | 4/2013 | Lee et al. | 370/328 |
| 2005/0094600 A1* | 5/2005 | Zhang et al. | 370/331 |
| 2007/0213060 A1* | 9/2007 | Shaheen | 455/436 |
| 2008/0019320 A1* | 1/2008 | Phan et al. | 370/331 |
| 2008/0153495 A1* | 6/2008 | Ogami et al. | 455/436 |
| 2008/0227456 A1* | 9/2008 | Huang et al. | 455/436 |
| 2008/0240439 A1* | 10/2008 | Mukherjee et al. | 380/272 |
| 2009/0042572 A1 | 2/2009 | Craig et al. | |
| 2009/0097451 A1* | 4/2009 | Gogic | 370/331 |
| 2009/0168723 A1* | 7/2009 | Meylan | 370/331 |
| 2009/0268637 A1* | 10/2009 | Chen | 370/254 |
| 2010/0003981 A1* | 1/2010 | Ahluwalia | 455/436 |
| 2010/0142407 A1* | 6/2010 | Serravalle | 370/254 |
| 2010/0142485 A1* | 6/2010 | Lee et al. | 370/331 |
| 2010/0142488 A1* | 6/2010 | Zhang et al. | 370/332 |
| 2010/0150049 A1* | 6/2010 | Kim et al. | 370/312 |
| 2010/0177736 A1* | 7/2010 | Wang et al. | 370/331 |
| 2010/0216475 A1* | 8/2010 | Hoole | 455/436 |
| 2010/0240375 A1* | 9/2010 | Ahluwalia | 455/439 |
| 2010/0323700 A1* | 12/2010 | Bachmann et al. | 455/436 |
| 2011/0116629 A1* | 5/2011 | Forsberg et al. | 380/44 |
| 2011/0117916 A1* | 5/2011 | Dahlen | 455/436 |
| 2011/0171979 A1* | 7/2011 | Rune | 455/458 |
| 2011/0176530 A1* | 7/2011 | Vikberg et al. | 370/338 |
| 2011/0269499 A1* | 11/2011 | Vikberg et al. | 455/524 |

FOREIGN PATENT DOCUMENTS

| | | |
|---|---|---|
| CN | 101189905 A | 5/2008 |
| WO | WO 2006/130063 A1 | 12/2006 |

OTHER PUBLICATIONS

Extended European Search Report issued in corresponding European Patent Application No. EP 09 83 9061 mailed Dec. 18, 2012.

3GPP Organizational Partners, "3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)", 2008, pp. 10-135.

International Search Report, mailed Nov. 5, 2009, in International Application No. PCT/CN2009/070337.

Huawei, "Carrier aggregation in Advanced E-UTRA", 3GPP TSG RAN WG1 #53, Jun. 30-Jul. 4, 2008, pp. 1-4.

3 GPP TR 36.814 V0.4.1, "3$^{rd}$ Generation Partnership Project; Technical Specification Radio Access Network; Further Advancements for E-UTRA Physical Layer Aspects", Release 9, Feb. 2009, pp. 1-31.

Written Opinion of the International Searching Authority mailed Nov. 5, 2009 issued in corresponding International Patent Application No. PCT/CN2009/070337.

3$^{rd}$ Generation Partnership Project; Technical Specification Group Radio Access Network; Evolved Universal Terrestrial Radio Access (E-UTRA) and Evolved universal Terrestrial Radio Access Network (E-UTRAN); Overall description; Stage 2 (Release 8), 3GPP TS 36.300 V8.6.0, Sep. 2008, pp. 1-137.

* cited by examiner

METHOD, APPARATUS AND SYSTEM FOR HANDOVER BETWEEN MULTI-CARRIER CELLS

CROSS-REFERENCE TO RELATED APPLICATIONS

This application is a continuation of International Application No. PCT/CN2009/070337, filed on Feb. 2, 2009, which is hereby incorporated by reference in its entirety.

FIELD OF THE INVENTION

The present invention relates to the radio communication field, and in particular to a method, an apparatus, and a system for handover between multi-carrier cells.

BACKGROUND OF THE INVENTION

In an LTE-A (long-term evolution advanced, long-term evolution advanced) system, a user equipment (UE) in the LTE-A may use more than one carrier after the carrier aggregation (Carrier Aggregation, CA) technology is applied. Generally, conditions of aggregation may be categorized into three types: continuous CA, discontinuous CA within the same band, and discontinuous CA within different bands.

In the prior art, when a UE moves to the edge of a neighboring cell, the UE generally judges whether the RSRP (Reference Signal Received Power, reference signal received power) value of the neighboring cell is one offset better than the RSRP value of serving cell through measuring RSRP of the neighboring cell; if yes, triggers an A3 event, and submits a measurement report triggered by the event. After receiving the measurement report, the serving cell may start a handover determination procedure.

Usually, a source eNB preferentially selects an eNB with multiple carriers being in the same cell as a target eNB. Using multiple carriers by a UE generally means that the current service data rate of the UE is comparatively high. If the source eNB selects only a single eNB as the target eNB, only one carrier has better channel quality, and other carriers have worse channel quality. Therefore, only the single carrier can be used to support the current service. The current service of the UE may not be well supported, and the user experience of an end user may deteriorate.

In the network topology of the CA, if the UE reports a cell 1 (corresponding to a carrier with the best quality) and a cell 2 (corresponding to a carrier with better quality) as candidate cells in the measurement result, generally, the source eNB may use the cell 1 rather than the cell 2 as the final target cell of the UE, so that the UE is handed over to the target eNB 1 of the cell 1. However, in this case, the UE can use only one carrier, so the data transmission rate is reduced.

SUMMARY OF THE INVENTION

Embodiments of the present invention provide a method, an apparatus, and a system for solving the problem that UE hands over to carriers of different cells of multiple target eNBs. The embodiments of the present invention employ the following technical solutions:

In embodiments of the present invention, a method for handover between multi-carrier cells includes:

receiving a measurement report triggered by an event submitted by a UE;

determining, according to the measurement report, to hand over the UE to corresponding carriers of different target eNBs; and sending SNs of data to be transferred and identifier information of target eNBs of other carriers to which the UE is handed over to different target eNBs or a master target eNB of the different target eNBs.

In embodiments of the present invention, another method for handover between multi-carrier cells includes:

after performing handover request acknowledge, receiving SNs of data to be transferred and identifier information of target eNBs of other carriers to which the UE is handed over from a source eNB; and transferring, according to the identifier information, scheduling information to the target eNBs of other carriers to which the UE is handed over.

In embodiments of the present invention, a handover apparatus includes:

a receiver, configured to receive a measurement report triggered by an event submitted by a UE;

a processor, configured to determine, according to the measurement report, to hand over the UE to corresponding carriers of different target eNBs; and a transmitter, configured to send SNs of data to be transferred and identifier information of target eNBs of other carriers to which the UE is handed over to different target eNBs or a master target eNB of the different target eNBs.

In embodiments of the present invention, another handover apparatus includes:

a receiver, configured to receive SNs of data to be transferred and identifier information of target eNBs of other carriers to which the UE is handed over from a source eNB after performing handover request acknowledge; and a transmitter, configured to transfer, according to the identifier information, scheduling information to the target eNBs of other carriers to which the UE is handed over.

In embodiments of the present invention, a system for handover between multi-carrier cells includes:

a first handover apparatus, configured on a source eNB and configured to: receive a measurement report triggered by an event submitted by a UE; determine, according to the measurement report, to hand over the UE to corresponding carriers of different target eNBs; and send SNs of data to be transferred and identifier information of target eNBs of other carriers to which the UE is handed over to a second handover apparatus on the different target eNBs or a master eNB of the different target eNBs; and a second handover apparatus, configured on the target eNBs and configured to: after performing handover request acknowledge, receive the SNs of data to be transferred and the identifier information of the target eNBs of other carriers to which the UE is handed over sent by the first handover apparatus on the source eNB; and transfer, according to the identifier information, scheduling information to the target eNBs of other carriers to which the UE is handed over.

The method, apparatus, and system for handover between multi-carrier cells provided by the embodiments of the present invention make a handover determination according to a measurement report triggered by an event submitted by a UE; if the UE is determined to be handed over to corresponding carriers of different target eNBs, SNs of data to be transferred and identifier information of the target eNBs of other carriers to which the UE is handed over are sent to different target eNBs or a master target eNB of the different target eNBs; after receiving the SNs, the different target eNBs transfer scheduling information. It is realized that multiple eNBs perform data interactions with the UE through multiple carriers, so that the data throughput of the UE during the handover at a cell edge is increased, and the data transmission efficiency is improved.

BRIEF DESCRIPTION OF THE DRAWINGS

To make the embodiments of the present invent or the technical solution of the prior art clearer, the embodiments or the accompanying drawings for illustrating the prior art are described in the following. Obviously, the accompanying drawings are only exemplary embodiments of the present invent, and those skilled in the art may derive other drawings from such accompanying drawings without creative efforts.

DETAILED DESCRIPTION OF THE EMBODIMENTS

The method, apparatus, and system for handover between multi-carrier cells are hereinafter described in detail with reference to the accompanying drawings.

It should be definite that, the embodiments are only a part of embodiments of the present invention rather than all the embodiments. Based on the embodiments in the present invention, every other embodiment obtained by those skilled in the art without making creative labor also fall within the protection scope of the present invention.

Figure 1:
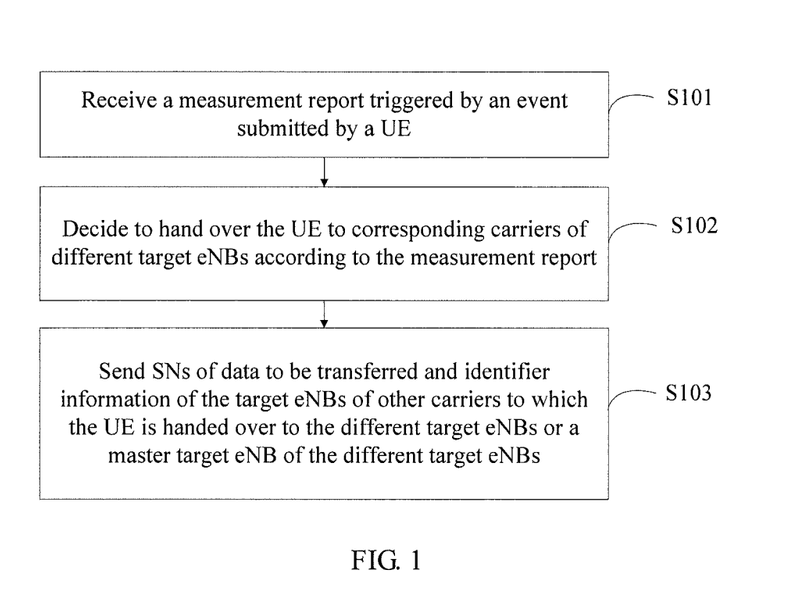
FIG. 1 is a flowchart of a method for handover between multi-carrier cells according to an embodiment of the present invention.

As shown in FIG. 1, a method for handover between multi-carrier cells according to an embodiment of the present invention includes:

S101: Receive a measurement report triggered by an event submitted by a UE.

S102: Determine, according to the measurement report, to hand over the UE to corresponding carriers of different target eNBs.

S103: Send SNs of data to be transferred and identifier information of the target eNBs of other carriers to which the UE is handed over to the different target eNBs or a master target eNB of the different target eNBs.

Figure 2:
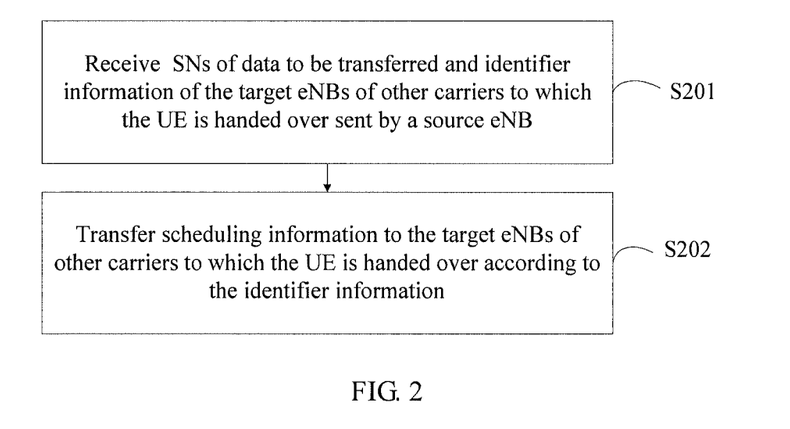
FIG. 2 is a flowchart of another method for handover between multi-carrier cells according to an embodiment of the present invention.

Another method for handover between multi-carrier cells according to an embodiment of the present invention includes:

S201: Receive SNs of data to be transferred and identifier information of the target eNBs of other carriers to which the UE is handed over sent by a source eNB.

S202: Transfer scheduling information to the target eNBs of other carriers to which the UE is handed over according to the identifier information.

The method for handover between multi-carrier cells provided by this embodiment of the present invention makes a handover determination according to a measurement report triggered by an event submitted by a UE; if the UE is determined to be handed over to corresponding carriers of different target eNBs, SNs of data to be transferred and identifier information of the target eNBs of other carriers to which the UE is handed over are sent to different target eNBs or a master target eNB of the different target eNBs; after receiving the SNs, the different target eNBs transfer scheduling information. It is realized that different target eNBs perform data interactions with the UE through multiple carriers, so that the data throughput of the UE during the handover at a cell edge is increased, and the data transmission efficiency is improved.

The embodiment 1 hereinafter takes that a UE is handed over to a target eNB1 of a neighboring cell 1 and a target eNB2 of a neighboring cell 2 when the UE moves to the edges of the neighboring cell 1 and the neighboring cell 2 as example to describe the embodiment of the present invention in detail.

In this embodiment, a parallel relationship exists between the target eNB1 and the target eNB2.

Figure 3:
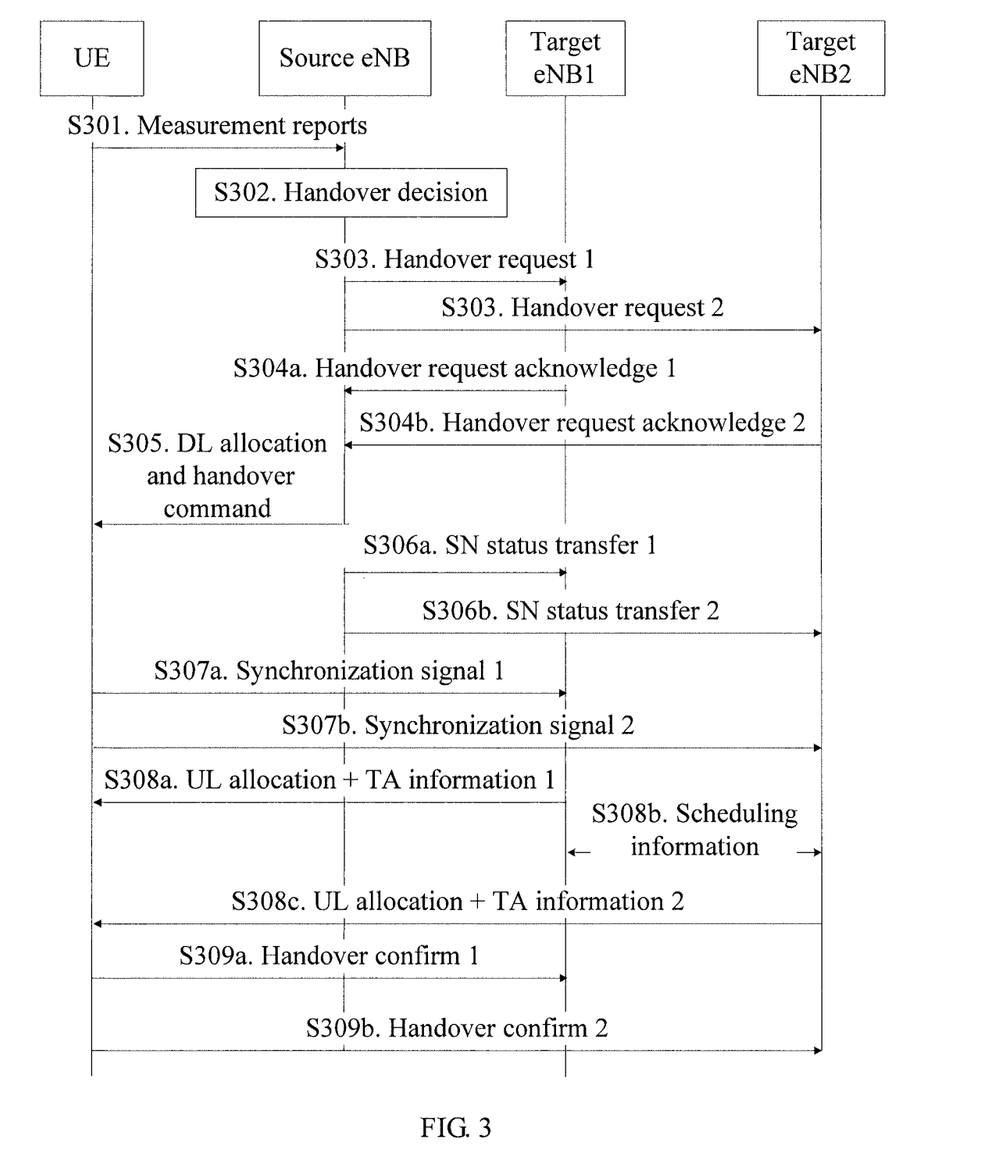
FIG. 3 is a flowchart of a method for handover between multi-carrier cells according to a first embodiment of the present invention.

As shown in FIG. 3, this embodiment may include the following steps:

S301: a UE submits a measurement report triggered by an event.

A source eNB may deliver some measured frequencies and control information to the UE. In this embodiment, when the UE moves to the edges of the neighboring cell 1 and the neighboring cell 2, the UE returns a measurement report (measurement reports) to the source eNB after measuring the cells. The measurement report may include identifier information of an event that triggers the measurement report, carrier information of the neighboring cell 1 and the neighboring cell 2 measured by the UE and corresponding measured values, and identifier information of the neighboring cell 1 and neighboring cell 2.

S302: After receiving the measurement report from the UE, the source eNB makes a handover determination.

Specifically, according to the measurement report, obtain related information about candidate cells of the UE, and judge whether the candidate cells are different cells of different eNBs. If not, determine to hand over the UE to corresponding carriers of different target eNBs. In this embodiment, the source eNB determinesto hand over the UE to the carriers of the target eNB1 of the neighboring cell 1 and the target eNB2 of the neighboring cell 2.

S303a~S303b: The source eNB sends handover requests (handover request), a handover request 1 and a handover request 2 as shown in FIG. 3, to the target eNB 1 and target eNB2.

S304a~S304b: The target eNB1 and target eNB2 return handover request acknowledges, a handover request acknowledge 1 and a handover request acknowledge 2, as shown in FIG. 3.

S305: The source eNB performs downlink allocation (DL allocation) on the UE and sends a handover command (handover command) to the UE so that the UE submits measurement reports on the allocated downlink resource, and notifies the UE to be handed over to the target cell.

S303~S305 are all the prior art, and are not detailed described herein.

S306a~S306b: The source eNB performs SN status transfer (SN Status Transfer) including an SN status transfer 1 and an SN status transfer 2 as shown in FIG. 3 to the target eNB.

The SN status transfer includes SNs of data to be transferred and identifier information of the target eNBs of other carriers to which the UE is handed over. Specifically, the SN status transfer 1 includes SNs of data to be transferred and identifier information of the target eNB2, and the SN status transfer 2 includes SNs of data to be transferred and identifier information of the target eNB1.

If the corresponding carriers of the different target eNBs carry the same service, multiple target eNBs need to serve the same service of the UE, and the source eNB needs to send a proper SN to multiple target eNBs. In this embodiment. It is preferred in this embodiment of the invention that the SNs of data to be transferred are sent to different target eNBs separately. For example, the SNs of data packets of a video service include odd and even, and the odd SN (SN Status Transfer 1) of data to be transferred is sent to the target eNB 1 by the source eNB, and the even SN (SN Status Transfer 2) of data to be transferred is sent to the target eNB2 by the source eNB. This embodiment of the invention is not limited to this mode. When the corresponding carriers of different target eNBs carry the same service, the source eNB may also send the same SN to each of the different target eNBs.

If the corresponding carriers of different target eNBs carry different services, different SNs of data to be transferred may be sent to different target eNBs by the source eNB according to the QoS requirements of different services. For example, according to the different QoS requirements of different services, the source eNB may preferably allocate services with higher QoS requirements (for example, real-time video services) to carriers that have stable channel status and more available resources.

This embodiment is not limited to the preceding two SN transfer modes. Other modes may be used to transfer the same SN or different SNs to different eNBs.

In addition, in the embodiment of the invention, the source eNB may also send identifier information of the target eNBs of other carriers to which the UE is handed over by using other modes. For example, the source eNB sends identifier information of the target eNBs of other carriers to which the UE is handed over through an additional signaling message.

S307a to S307b: The UE sends a synchronization signal (Synchronization) 1 and a synchronization signal 2 to the target eNB1 and the target eNB2.

This step is the prior art, and is not detailedly described.

S308a to S308c: After receiving the SN status transfer message, the target eNB1 and target eNB2 deliver scheduling information, and send uplink allocation and timing advance to the UE respectively.

Specifically, the target eNB1 may send uplink allocation and timing advance (UL allocation+TA) 1 to the UE. Meanwhile, the target eNB1 sends scheduling information to the target eNB2, so that the target eNB2 can cooperate with the target eNB1 in scheduling and send proper uplink allocation and timing advance 2 to the UE.

The scheduling information includes scheduling rules, continuous scheduling or discontinuous scheduling for example, and scheduling results and so on.

The invention is not limited to the preceding mode. The target eNB2 may also send uplink allocation and timing advance information to the UE firstly, and send scheduling information to the target eNB1, so that the target eNB1 can cooperate with the target eNB2 in scheduling and send proper uplink allocation and timing advance information to the UE.

The transmission of scheduling information between the eNB1 and the eNB2 may be negotiated between the eNB1 and the eNB2, and is not limited in the embodiment of the invention.

S309a to S309b: After receiving the uplink allocation and timing advance information, the UE instructs the target eNBs to get ready to transfer data through a handover confirm (handover confirm) including a handover confirm 1 sent to the target eNB1 and a handover confirm 2 sent to the target eNB2.

After the UE finished the handover confirm, the eNB1 and the eNB2 may continue to transfer data to be transferred to the UE according to the SNs of data to be transferred. Accordingly, it is realized that the UE is handed over from the source eNB to the target eNB1 and the target eNB2, and realized handover between multi-carrier cells.

As an embodiment of the present invention, the handover between the source cell and the target cell is via an X2 interface between the source eNB and target eNB, or via a mobility management entity (MME) connected to the source eNB and the target eNB respectively.

The second embodiment takes a UE is handed over to a master target eNB of a neighboring cell 1 and a slave target eNB of a neighboring cell 2 when the UE moves to the edges of the neighboring cell 1 and the neighboring cell 2 as example to describe the embodiment of the present invention in detail.

In this embodiment, the target eNBs include a master target eNB and a slave target eNB.

Figure 4:
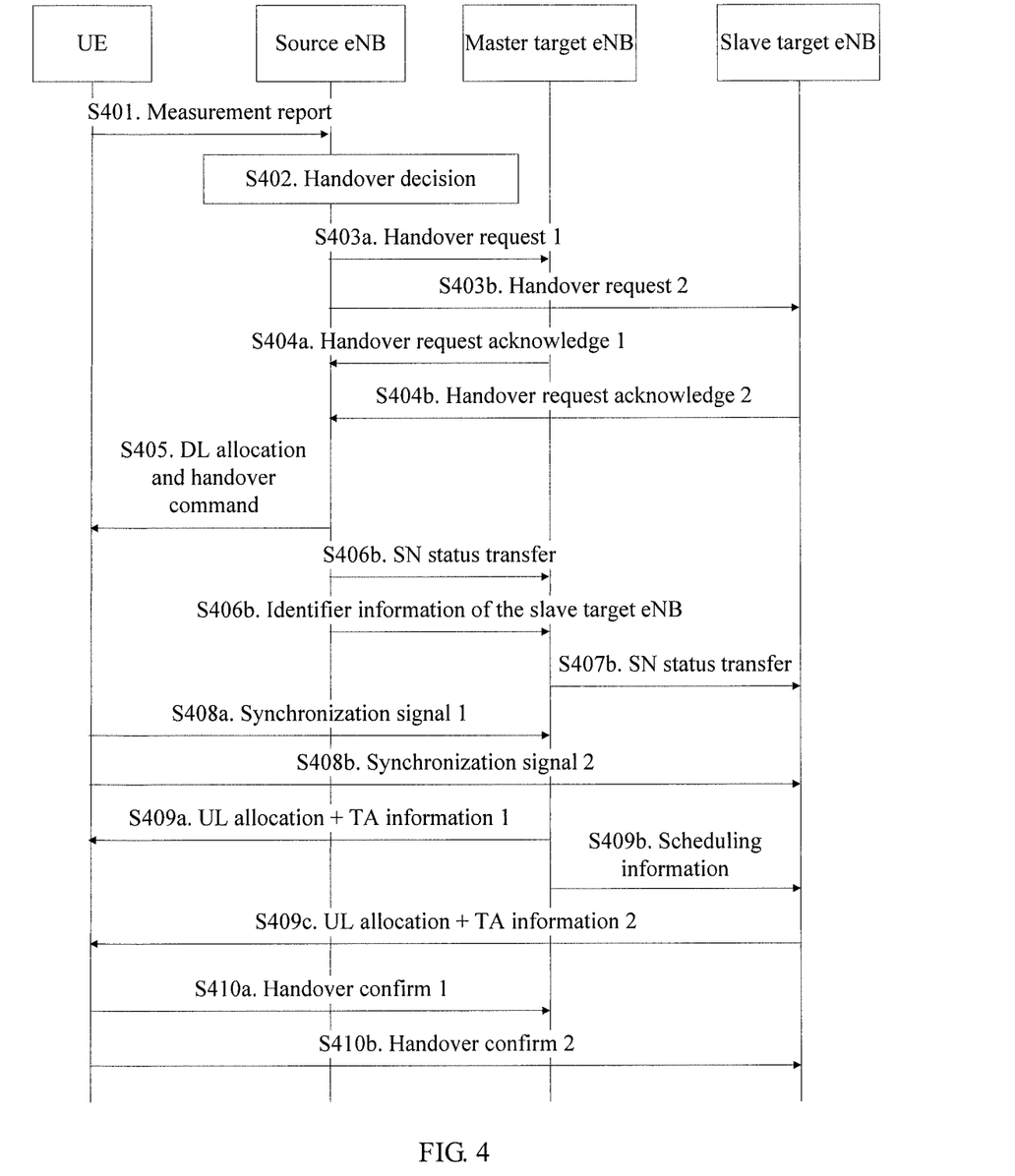
FIG. 4 is a flowchart of a method for handover between multi-carrier cells according to a second embodiment of the present invention.

As shown in FIG. 4, this embodiment may include the following steps:

S401 to 5405 are the same as S301 to S305 in the first embodiment, where, the eNB1 refers to the master target eNB in this embodiment, and the eNB2 refers to the slave target eNB in this embodiment. The detailed steps are not described.

S406a to S406b: The source eNB sends an SN status transfer (SN Status Transfer) to the master target eNB and sends identifier information of the slave target eNB of other carriers to which the UE is handed over to the master target eNB. The SN status transfer includes SNs of data to be transferred.

If there is more than one slave target eNB, the source eNB sends identifier information of all the slave target eNBs to the master target eNB.

In the embodiment of the invention, the source eNB may also send identifier information of the slave target eNB of other carriers to which the UE is handed over by using other modes. For example, the SN status transfer may include identifier information of the slave target eNB. That is, in the embodiment of the invention, whether the SN status transfer includes identifier information of the slave target eNB is not limited. Identifier information of other target eNBs may be sent to the source target eNB by using multiple modes.

S407: The master target eNB sends an SN status transfer, including the SNs of data to be transferred, to the slave target eNB according to the received identifier information of the slave target eNB.

The master target eNB may send the received SNs of data to be transferred to each slave target eNB. Obviously, the master target eNB may also send the received SNs of data to be transferred to different slave target eNBs separately; or if multiple target eNBs carry different services, the master target eNB sends different SNs to different slave target eNBs according to the QoS requirements of different services.

S408a to S408b: The UE sends a synchronization signal (Synchronization) 1 and a synchronization signal 2 to the master target eNB and the slave target eNB.

This step is prior art, and is not detailedly described.

S409a to S409c: After receiving the SN status, the master target eNB and the slave target eNB transfer scheduling information, and send uplink allocation and timing advance to the UE respectively.

Specifically, the master target eNB may send uplink allocation and timing advance (UL allocation+TA) 1 to the UE. Meanwhile, the master target eNB sends scheduling information to the slave target eNB, so that the slave target eNB can cooperate with the master target eNB in scheduling and send proper uplink allocation and timing advance 2 to the UE.

The scheduling information includes scheduling rules, for example, continuous scheduling or discontinuous scheduling, and scheduling results and so on.

S410a to S410b: After receiving the uplink allocation and timing advance, the UE instructs the target eNBs to get ready to transfer data through a handover confirm (handover confirm) including a handover confirm 1 sent to the master target eNB and a handover confirm 2 sent to the slave target eNB.

After the UE finished the handover confirm, the master target eNB and the slave target eNB may continue to transfer data to be transferred to the UE according to the SNs of data to be transferred. It is realized that the UE is handed over from the source eNB to the master target eNB and the slave target eNB, and handover between multi-carrier cells is realized.

For eNBs with a master-slave relationship, only a link between the core network (Core Network) and the master eNB is needed; for eNBs with a parallel relationship, there is a link between core network and each eNB.

By using the method for handover between multi-carrier cells provided in the embodiment of the present invention, after making a handover determination, the source eNB determines to hand over the UE to multiple carriers of different target eNBs, and then sends the same or different SNs and identifier information of the target eNBs of other carriers to which the UE is handed over to each target eNB or the master target eNB of each target eNB according to the requirements; after receiving the SNs, the target eNBs can transfer scheduling information between different eNBs, so as to cooperate with the UE in data transmission between different eNBs. Multi-carrier data transmission is implemented on different eNBs, and the data throughput of the UE is increased.

Figure 5:
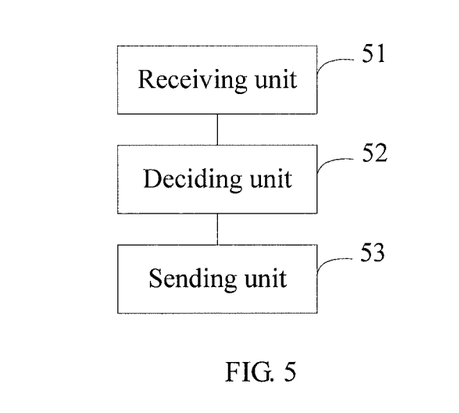
FIG. 5 is a schematic diagram of an apparatus for handover between multi-carrier cells according to an embodiment of the present invention.

As shown in FIG. 5, a handover apparatus provided in an embodiment of the present invention includes:

a receiving unit 51, configured to receive a measurement report triggered by an event submitted by a UE;

a determining unit 52, configured to determine, according to the measurement report, to hand over the UE to corresponding carriers of different target eNBs; and a sending unit 53, configured to send SNs of data to be transferred and identifier information of target eNBs of other carriers to which the UE is handed over to the different target eNBs or a master target eNB of the different target eNBs.

Figure 6:
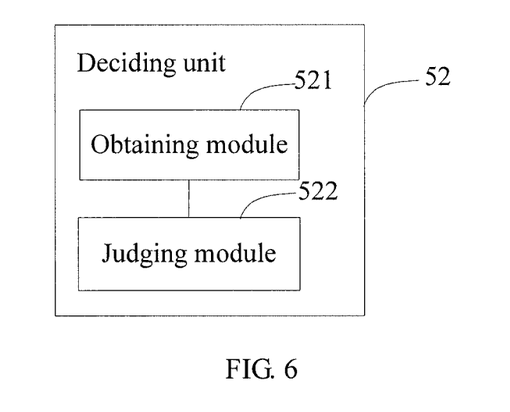
FIG. 6 is a schematic diagram of a determining unit according to an embodiment of the present invention.

As shown in FIG. 6, in an exemplary embodiment of the present invention, further, the determining unit 52 includes:

an obtaining module 521, configured to obtain related information about candidate cells of the UE according to the measurement report; and a judging module 522, configured to instruct the sending unit to send the SNs of data to be transferred to different target eNBs when determining that the candidate cells are different cells of different target eNBs.

In this embodiment, the handover apparatus may be configured on the eNB. On the basis of the preceding embodiment, where, the SNs of data to be transferred that are sent to the different target eNBs may be different.

In addition, in this embodiment, the UE may be handed over to carriers of different target eNBs with reference to the operation of the source eNB in the method for handover between multi-carrier cells shown in FIG. 3.

Figure 7:
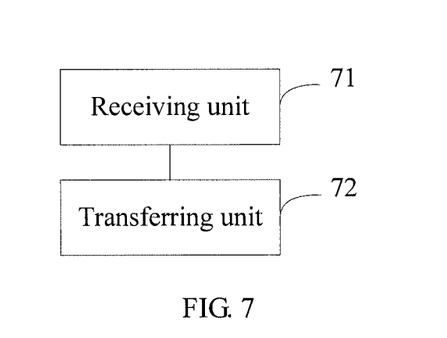
FIG. 7 is a schematic diagram of another apparatus for handover between multi-carrier cells according to an embodiment of the present invention.

As shown in FIG. 7, another handover apparatus provided in an embodiment of the present invention includes:

a receiving unit 71, configured to receive SNs of data to be transferred and identifier information of target eNBs of other carriers to which the UE is handed over sent by a source eNB; and a transferring unit 72, configured to transfer scheduling information to the target eNBs of other carriers to which the UE is handed over according to the identifier information.

On the basis of the preceding solution, the handover apparatus may further include a first sending unit, configured to send the SNs of data to be transferred to the target eNBs of other carriers to which the UE is handed over according to the identifier information after the receiving unit receives the SNs of data to be transferred and the identifier information.

The apparatus solution provided in this embodiment may refer to the operations of the master target eNB in the method for handover between multi-carrier cells of embodiment shown in FIG. 4, so as to realize handing over the UE to the carriers of the different target eNBs.

On the basis of the preceding solution, the handover apparatus further includes a second sending unit, configured to send uplink allocation and timing advance information to the UE.

In addition, the transferring unit 72 further includes:

a first transferring module, configured to send scheduling information to the target eNBs of other carriers to which the UE is handed over after the second sending unit sends the first uplink allocation and timing advance information to the UE, the scheduling information is used for enabling the target eNBs of other carriers to send the second uplink allocation and timing advance information to the UE according to the scheduling information; or a second transferring module, configured to receive the scheduling information sent by the target eNBs of other carriers to which the UE is handed over, and after the receiving, instruct the sending unit to send uplink allocation and timing advance information to the UE according to the scheduling information.

This solution may refer to the operations of the target eNB in method for handover between multi-carrier cells of embodiment shown in FIG. 3 or FIG. 4, so as to realize handing over the UE to the carriers of the different target eNBs.

The handover apparatus provided in this embodiment may be configured on the eNB.

Figure 8:
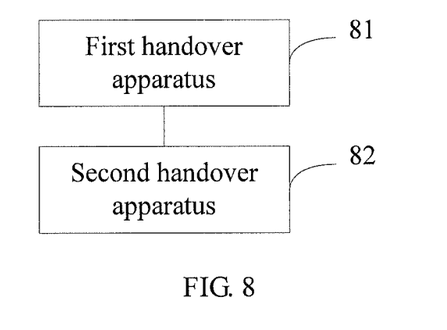
FIG. 8 is a schematic diagram of a transferring unit according to an embodiment of the present invention.

As shown in FIG. 8, a system for handover between multi-carrier cells provided in an embodiment of the present invention includes:

a first handover apparatus 81, configured on the source eNB and configured to: receive a measurement report triggered by an event submitted by a UE; determine, according to the measurement report, to hand over the UE to corresponding carriers of different target eNBs; and send SNs of data to be transferred and identifier information of the target eNBs of other carriers to which the UE is handed over to a second handover apparatus 82 on the different target eNBs or the master target eNB of the different target eNBs; and the second handover apparatus 82, configured on the target eNBs and configured to: after performing handover request acknowledge, receive SNs of data to be transferred and identifier information of the target eNBs of other carriers to which the UE is handed over sent by the first handover apparatus 81 on the source eNB; and transfer scheduling information to the target eNBs of other carriers to which the UE is handed over according to the identifier information.

On the basis of the preceding solution, in this embodiment, the first handover apparatus 81 preferably sends different SNs of data to be transferred to different target eNBs.

The system for handover between multi-carrier cells of this embodiment may refer to the operations of the source eNB and the target eNB in method for handover between multi-carrier cells of embodiment shown in FIG. 3 and FIG. 4, so as to realize handing over the UE to the carriers of the different target eNBs.

The handover apparatus and system provided in embodiments of the present invention make a handover determination according to a measurement report triggered by an event submitted by a UE; if the UE is determined to be handed over to corresponding carriers of different target eNBs, SNs of data to be transferred and identifier information of the target eNBs of other carriers to which the UE is handed over are sent to different target eNBs or the master target eNB of the different target eNBs; after receiving the SNs, the different target eNBs transfer scheduling information. It is realized that multiple eNBs perform data interactions with the UE through multiple carriers, so that the data throughput of the UE during the handover at a cell edge is increased, and the data transmission efficiency is improved.

It is understandable to those skilled in the art that all or part of the processes in the preceding embodiments may be implemented by related hardware instructed by a computer program. The program may be stored in a computer readable storage medium. When the program runs, the processes of the preceding methods are carried out. The preceding storage medium may be a magnetic disk, a compact disk, a read only memory (Read-Only Memory, ROM), or a random access memory (Random Access Memory, RAM) and so on.

The preceding descriptions are merely exemplary embodiments of the present invention, but not intended to limit the scope of the present invention. Any modification or variation made without departing from the spirit and principle of the present invention should fall within the protection scope of the present invention. Therefore, the protection scope of the present invention is subject to the appended claims.

What is claimed is:

1. A method for handover between multi-carrier cells, comprising:
receiving a measurement report triggered by an event submitted by a user equipment (UE);
determining, according to the measurement report, to hand over the UE to corresponding carriers of different target evolved NodeBs (eNBs); and
sending serial numbers (SNs) of data to be transferred and identifier information of target eNBs of other carriers to which the UE is handed over to the different target eNBs or a master target eNB of the different target eNBs;
wherein the sending SNs of data to be transferred and identifier information of the target eNBs of other carriers to which the UE is handed over to the different target eNBs or a master target eNB of the different target eNBs comprises:
sending the SNs of data to be transferred to the different target eNBs directly or separately, and sending the identifier information of the target eNBs of other carriers to which the UE is handed over to each different target eNB simultaneously, when a parallel relationship exists between each target eNB, and when the corresponding carriers of the different target eNBs carry the same service;
sending different SNs of data to be transferred and the identifier information of the target eNBs of other carriers to which the UE is handed over to the different target eNBs according to quality of service (QoS) requirements of different services, when a parallel relationship exists between each target eNB, and when the corresponding carriers of the different target eNBs carry different services; and
sending SNs of data to be transferred and identifier information of slave target eNBs of other carriers to which the UE is handed over to a master target eNB, when a master-slave relationship exists between the different target eNBs.

2. The method of claim 1, wherein the determining to hand over the UE to corresponding carriers of different target eNBs according to the measurement report comprises:
obtaining related information about candidate cells of the UE according to the measurement report; and
when the candidate cells are different cells of different eNBs, determining to hand over the UE to corresponding carriers of different target eNBs.

3. The method of claim 1, wherein when the parallel relationship exists between each target eNB, different SNs of data to be transferred are sent to each target eNB.

4. A method of handover between multi-carrier cells, comprising:
receiving serial numbers (SNs) of data to be transferred and identifier information of different target evolved NodeBs (eNBs) of other carriers to which a user equipment (UE) is handed over sent by a source eNB; and
transferring scheduling information to the target eNBs of other carriers to which the UE is handed over according to the identifier information, or receiving scheduling information sent by the target eNBs of other carriers to which the UE is handed over, and
wherein the SNs of the data to be transferred that are received by the target eNBs of each carrier to which the UE is handed over are different, and
wherein the transferring scheduling information to the target eNBs of other carriers to which the UE is handed over according to the identifier information comprises:
sending first uplink allocation and timing advance information to the UE; and
sending scheduling information to the target eNBs of other carriers to which the UE is handed over, the scheduling information is used for enabling the target eNBs of other carriers to send the second uplink allocation and timing advance information to the UE according to the scheduling information.

5. The method of claim 4, wherein after receiving the SNs of data to be transferred and the identifier information, the method further comprises:
sending the SNs of data to be transferred to the target eNBs of other carriers to which the UE is handed over according to the identifier information.

6. The method of claim 4, wherein the receiving scheduling information sent by the target eNBs of other carriers to which the UE is handed over comprises:
receiving scheduling information sent by target eNBs of other carriers to which the UE is handed over; and
sending uplink allocation and timing advance information to the UE according to the scheduling information.

7. The method of claim 4, wherein the scheduling information comprises scheduling rules or scheduling results.

8. A handover apparatus, comprising:
a receiver, configured to receive a measurement report triggered by an event submitted by a user equipment (UE);
a processor, configured to determine, according to the measurement report received by the receiver, to hand over the UE to corresponding carriers of different target evolved NodeBs (eNBs); and
a transmitter, configured to send serial numbers (SNs) of data to be transferred and identifier information of target eNBs of other carriers to which the UE is handed over to the different target eNBs or a master target eNB of the different target eNBs;
wherein, the transmitter is specifically configured to:
sending the SNs of data to be transferred to the different target eNBs directly or separately, and sending the identifier information of the target eNBs of other carriers to which the UE is handed over to each different target eNB simultaneously, when a parallel relationship exists between each target eNB, and when the corresponding carriers of the different target eNBs carry the same service;
sending different SNs of data to be transferred and the identifier information of the target eNBs of other carriers to which the UE is handed over to the different target eNBs according to quality of service (QoS) requirements of different services, when the parallel relationship exists between each target eNB, and when the corresponding carriers of the different target eNBs carry different services; and
sending SNs of data to be transferred and identifier information of slave target eNBs of other carriers to which the UE is handed over to a master target eNB, when a master-slave relationship exists between the different target eNBs.

9. The handover apparatus of claim 8, wherein the processor comprises:
an obtaining module, configured to obtain related information about candidate cells of the UE according to the measurement report received by the receiver; and
a judging module, configured to instruct the transmitter to send the SNs of data to be transferred to the different target eNBs when determining that the candidate cells are different cells of the different target eNBs.

10. A handover apparatus, comprising:
a receiver, configured to receive serial numbers (SNs) of data to be transferred and identifier information of target evolved NodeBs (eNBs) of other carriers to which a user equipment (UE) is handed over sent by a source eNB;
a transmitter, configured to transfer scheduling information to the target eNBs of other carriers to which the UE is handed over according to the identifier information, or to receive scheduling information sent by the target eNBs of other carriers to which the UE is handed over, and
a first sending unit, configured to send the SNs of data to be transferred to the target eNBs of other carriers to which the UE is handed over according to the identifier information after the receiving unit receives the SNs of data to be transferred and the identifier information.

11. The handover apparatus of claim 10, wherein:
the handover apparatus further comprises a second sending unit, configured to send uplink allocation and timing advance information to the UE; and
the transferring unit comprises:
a first transferring module, configured to send scheduling information to the target eNBs of other carriers to which the UE is handed over after the second sending unit sends first uplink allocation and timing advance information to the UE, so that the target eNBs of other carriers can send second uplink allocation and timing advance information to the UE according to the scheduling information; or
a second transferring module, configured to receive the scheduling information sent by the target eNBs of other carriers to which the UE is handed over, and after the receiving, instruct the second sending unit to send uplink allocation and timing advance information to the UE according to the scheduling information.

12. A method for handover between multi-carrier cells, comprising:
receiving serial numbers (SNs) of data to be transferred and identifier information of different target evolved NodeBs (eNBs) of other carriers to which a user equipment (UE) is handed over sent by a source eNB; and
transferring scheduling information to the target eNBs of other carriers to which the UE is handed over according to the identifier information, or receiving scheduling information sent by the target eNBs of other carriers to which the UE is handed over wherein the scheduling information comprises scheduling rules or scheduling results, and
wherein the transferring scheduling information to the target eNBs of other carriers to which the UE is handed over according to the identifier information comprises:
sending first uplink allocation and timing advance information to the UE; and
sending scheduling information to the target eNBs of other carriers to which the UE is handed over, the scheduling information is used for enabling the target eNBs of other carriers to send the second uplink allocation and timing advance information to the UE according to the scheduling information.

13. The method of claim 12, wherein after receiving the SNs of data to be transferred and the identifier information, the method further comprises:
sending the SNs of data to be transferred to the target eNBs of other carriers to which the UE is handed over according to the identifier information.

14. The method of claim 12, wherein the receiving scheduling information sent by the target eNBs of other carriers to which the UE is handed over comprises:
receiving scheduling information sent by target eNBs of other carriers to which the UE is handed over; and
sending uplink allocation and timing advance information to the UE according to the scheduling information.

15. A handover apparatus, comprising:
a receiver, configured to receive serial numbers (SNs) of data to be transferred and identifier information of different target evolved NodeBs (eNBs) of other carriers to which a user equipment (UE) is handed over sent by a source eNB; and
a transmitter, configured to transfer scheduling information to the target eNBs of other carriers to which the UE is handed over according to the identifier information, or to receive scheduling information sent by the target eNBs of other carriers to which the UE is handed over;
wherein:
the handover apparatus further comprises a second sending unit, configured to send uplink allocation and timing advance information to the UE; and
the transferring unit comprises:
a first transferring module, configured to send scheduling information to the target eNBs of other carriers to which the UE is handed over after the second sending unit sends first uplink allocation and timing advance information to the UE, so that the target eNBs of other carriers can send second uplink allocation and timing advance information to the UE according to the scheduling information; or a second transferring module, configured to receive the scheduling information sent by the target eNBs of other carriers to which the UE is handed over, and after the receiving, instruct the second sending unit to send uplink allocation and timing advance information to the UE according to the scheduling information, and wherein the transferring scheduling information to the target eNBs of other carriers to which the UE is handed over according to the identifier information comprises:

sending first uplink allocation and timing advance information to the UE; and sending scheduling information to the target eNBs of other carriers to which the UE is handed over, the scheduling information is used for enabling the target eNBs of other carriers to send the second uplink allocation and timing advance information to the UE according to the scheduling information.

* * * * *